United States Patent [19]

Freiberg et al.

[11] 3,740,664

[45] June 19, 1973

[54] HYBRID FREQUENCY STABLE LASER SYSTEM

[75] Inventors: Robert J. Freiberg, South Windsor; Carl J. Buczek, Manchester, both of Conn.

[73] Assignee: United Aircraft Corporation, East Hartford, Conn.

[22] Filed: Feb. 22, 1972

[21] Appl. No.: 228,185

[52] U.S. Cl. .............................................. 331/94.5
[51] Int. Cl. .............................................. H01s 3/11
[58] Field of Search .................. 331/94.5; 330/4.3; 350/160

[56] References Cited
UNITED STATES PATENTS
3,395,367   7/1968   Bell et al ............................ 331/94.5

Primary Examiner—William L. Sikes
Attorney—Anthony J. Criso

[57] ABSTRACT

The output beam from a low power, stable frequency laser is injected into a higher power laser having a high gain medium therein to provide an output beam from the over all system which has the characteristics of both high power and stable frequency. The higher power laser is capable of self oscillation when no external stimulating signal is provided. A stable frequency drive signal, having a competitive line, is injected into the high gain medium causing the higher power laser to operate on a line different from the self oscillating line. A wavelength discriminator which samples the system output is used to tune the higher power laser to the wavelength of the stable frequency laser. An analysis of the locking phenomenon is also provided.

4 Claims, 5 Drawing Figures

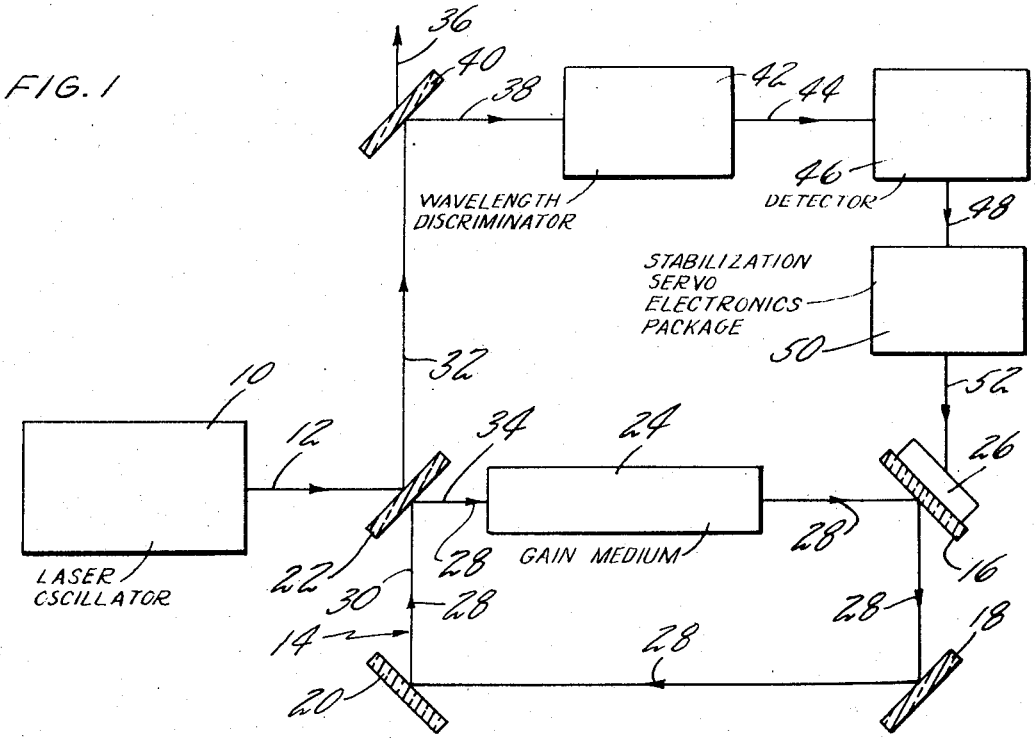
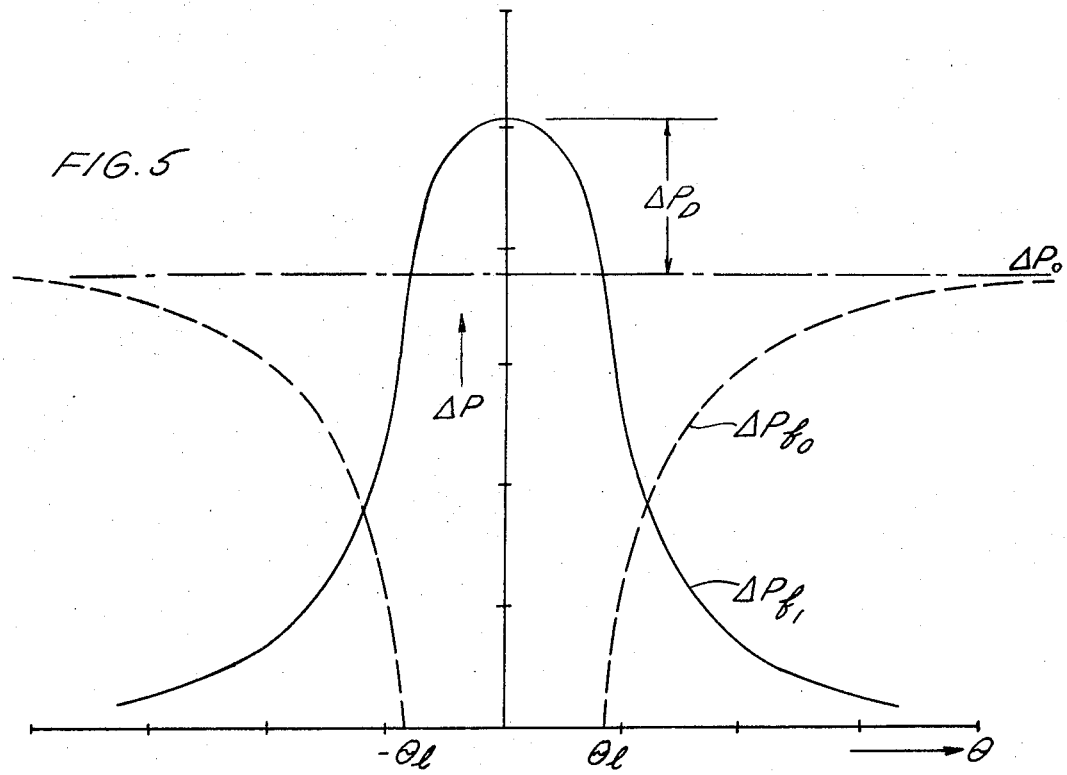

HYBRID FREQUENCY STABLE LASER SYSTEM

BACKGROUND OF THE INVENTION

1. Field of Invention

This invention relates to lasers and more particularly to a laser system that produces an output beam of laser energy at relatively high power and at a stable frequency. The invention herein described was made in the course of or under a contract or subcontract thereunder, with the Department of the Air Force.

2. Description of the Prior Art

Various scientists have reported the operation of an oscillator device having a resonance characteristic that is locked to a signal which is originated external of and injected into the oscillator. Injection locking of this type is one technique for producing a gain in the power level of the original signal.

The classic analysis of frequency locking is attributed to R. Adler as described in "A Study of Locking Phenomena in Oscillators," Proceedings IRE, Volume 34, June 1946, pp. 351–357. His approach has been applied specifically to laser locking and a theoretical discussion thereof has appeared in such publications as C. L. Tang et al., "Phase Locking of Laser Oscillators by Injected Signals," Journal of Applied Physics, Volume 38, January 1967, pp. 323–324. The first experimental success with laser frequency locking was reported by Stover et al in "Locking of Laser Oscillators by Light Injection," Applied Physics Letters, Volume 8, No. 4, Feb. 1966, pp. 91–93; in the Stover experiment, two helium neon gas lasers were operated on the same transition and a phase comparison was the basis for tuning the driven cavity.

Classic injection locking rationale has been improved upon in the laser field by what has become known as conventional injection techniques in which a high gain resonant laser cavity is frequency locked to the output from another usually low power laser resonant cavity; each cavity operates on the same laser transition and the frequency locking is accomplished by amplitude comparison of the output signal from the overall system. U.S. Pat. No. 3,646,469, "Traveling Wave Regenerative Laser Amplifier," filed by C. J. Buczek et al. on Mar. 20, 1970, and U.S. Pat. No. 3,646,468, "Servo Aided Injection Phase Locked Laser Oscillator," filed by C. J. Buczek et al. on Mar. 30, 1970, and held with the present invention by a common assignee, are particular examples of such conventional injection locking techniques. There is, however, a still unfilled need for beams of laser energy having both a very stable frequency and higher power than are presently available.

SUMMARY OF THE INVENTION

An object of the present invention is to lock and drive a resonant optical cavity containing a high gain medium with a low power source at a stable frequency to produce a high power beam of output laser energy at the stable frequency.

Another object of the present invention is to provide a laser output at a stable frequency from a laser cavity in which the circulating power saturates the active gain medium.

A further object of the present invention is to provide a laser beam having a stable single frequency and sufficient power to be practical for use in Doppler navigation systems and various homodyne and heterodyne systems.

According to the present invention, a source of electromagnetic radiation at a stable frequency is injected into a resonant laser cavity which is tuned to self quench self oscillation at the resonant frequency, causing the laser system to amplify the injected beam and provide a laser output beam having high power and being stable at the frequency of the injected source. The resonant cavity has a sufficient small signal gain to operate as an oscillator; however, when the injected beam is introduced into the cavity and amplified therein, the gain of the resonant cavity is below the threshold value for self oscillation and the cavity operates as an amplifier. As a practical matter, the source of electromagnetic radiation is a very stable frequency low power oscillator.

An advantage of the present invention is that a laser beam can be frequency stabilized at higher levels of power than previously and over a variety of different laser lines. An additional advantage is that an easily discernible amplitude discriminant is available for stabilization of the frequency of the high power output. The present invention has the characteristics of lightweightness and compactness. Further, the system operating characteristics can be optimized in that the burden for providing a required frequency stability can be placed on the low power driving laser while the burden of providing the necessary power and efficiency can be isolated onto the driven or high power laser. This invention is unique in that the laser transition from the low power, frequency stable oscillator and the laser transition at which self oscillation occurs in the ring laser are different from one another.

Other objects, features and advantages of the present invention will become more apparent in the light of the following detailed description of some preferred embodiments thereof as illustrated in the accompanying drawing and described hereinafter.

BRIEF DESCRIPTION OF THE DRAWING

FIG. 1 is a simplified schematic diagram of a preferred embodiment of the present invention with the driven laser in a ring configuration;

FIG. 5 is an illustration of the driven and undriven contributions to the total extracted power as a function of cavity tuning angle both within and outside the frequency locking range.

DESCRIPTION OF THE PREFERRED EMBODIMENT

Figure 2:
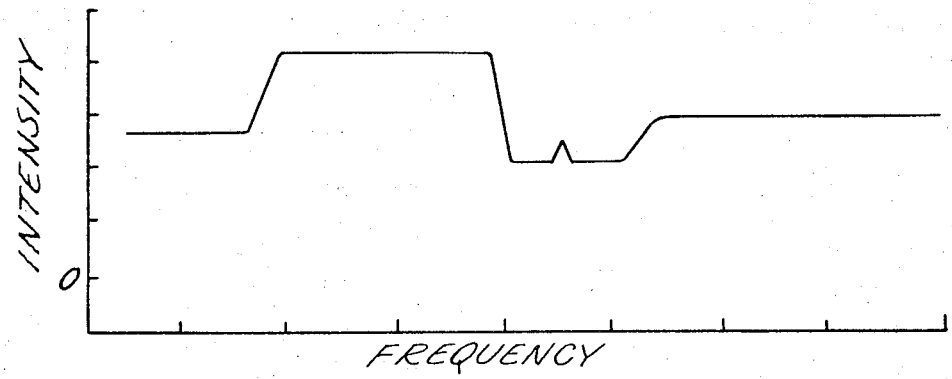
FIG. 2 is an illustration of the intensity of the output signal over the range frequency at which the system does oscillate.

The frequency stabilization of a system in which a regenerative ring laser is driven by a master oscillator with conventional injection locking is readily accomplished if the circulating power within the ring laser is substantially less than the saturation power for the gain medium contained therein. When the power circulating within the ring is at a relatively low level, an injected power can affect the gain medium and cause the total power extracted from the ring laser to be much greater than the ring laser power due to self oscillation alone; further the locking frequency range which is defined as the frequency interval over which the self oscillation of the driven laser is completely quenched and the driven laser output consists entirely of and is phase locked to the injected signal, becomes relatively broad in such an arrangement. Under these conditions, the signal to noise ratio of the amplitude discriminant which is frequency-dependent is sufficiently high that a reliable frequency stabilization can be easily maintained. However, for laser operation with a typical carbon dioxide system at powers in excess of about twenty watts the circulating power saturates the active medium and the problem of frequency stabilization becomes substantially more difficult. As the power extracted from the ring laser due to self oscillation approaches the maximum available total power extractable from the ring laser, the circulating power within the ring approaches saturation of the active medium and the injected signal produces a very small perturbation upon the output power. Thus, as the extracted power due to self oscillation increases, the discriminant becomes more difficult to discern and frequency stabilization becomes more difficult. To avoid the condition just described and increase the range over which the system output can be frequency stabilized, either the drive power can be increased or the mirror reflectivity within the ring laser can be decreased; unfortunately, neither of these approaches is practical. More specifically, if the reflectivity is reduced, the extracted power due to self oscillation is correspondingly reduced and an overall high power output cannot be reached because the system net output power is a strong function of the power due to self oscillation. Further, any decrease in mirror reflectivity within the ring laser must be compensated for by an increase in the power of the drive system but this is undesirable because increasing the power of the drive signal causes a compromise of stability in the frequency of the drive signal. Alternatively, a hybrid frequency stabilization system according to the present invention circumvents the above-described limitations and allows laser operation at a very stable frequency and at output powers in excess of fifty watts.

The hybrid injection locking system of the present invention differs from both the classic and conventional injection locking in that the injected signal from the stable, low power oscillator is chosen to be a laser line transition which does not correspond to the line transition at which self oscillation of the driven or high power laser occurs. The two signals involved are necessarily due to different line transitions and this difference is a principal distinction between the present invention and all other previously known injection locking techniques. For fundamental mode operation in a homogeneously broadened gain medium, only one transition will oscillate at any given time due to the strong line competition inherently present. Therefore, the characteristics of a low power signal injected into the high power laser play a strong role in determining the transition upon which the latter tends to oscillate. Accordingly, when the optical cavity of the high power laser is properly adjusted with respect to the frequency of the stable low power signal, the undriven self oscillation of all other transitions is quenched, that is the extracted power due to self oscillation in the ring is zero, and the net output power extracted from the system will be at the precise frequency of the injected low power signal and substantially amplified.

A general discussion of the characteristics of regenerative laser ring amplifiers entitled "Carbon Dioxide Regenerative Ring Amplifiers" has been published in the Journal of Applied Physics, Volume 42, No. 8, July 1971, pp. 3,133–3,137.

Referring to FIG. 1, a laser oscillator 10 produces a drive beam 12; the oscillator is typically a low power resonant device which produces laser energy at a very stable single frequency. The beam 12 enters a ring laser 14 which includes three mirrors 16, 18 and 20, each of which is fully reflecting, a beam splitter 22 and a gain medium 24. Attached to the mirror 16 is a piezoelectric transducer 26. The beam 12 which passes through the beam splitter 22 travels along a resonant optical path 28 in a clockwise direction internal of the ring laser. A amplified beam 30 is incident upon the beam splitter 22 and is divided into a transmitted component and a reflected component; the transmitted component forms a ring laser output beam 32 and the reflected component is directed through the amplifying medium 24. The reflected component and the transmitted component of the drive beam 12 combine to form a gain medium input beam 34 which passes through the gain medium 24 and emerges as the amplified beam 30. The output beam 32 is divided into a system output beam 36 and a small feedback beam 38 by a beam splitter 40. A wavelength discriminator 42 transmits only the transition associated with the drive beam 12 and converts the feedback beam into a detector input beam 44 which in turn enters a detector 46. A detector output signal 48 activates a stabilization servo electronics package 50 which in turn produces a piezoelectric transducer error signal 52.

In operation, the oscillator 10 provides a low power beam generally in the range from a fraction of a watt to several watts as the stable frequency drive beam 12. The output mirror of the oscillator provides a sufficient reflectivity so that if the ring laser 14 were to begin oscillating in the counterclockwise direction, enough of the counterclokwise beam which passes through the beam splitter 22 and reached the oscillator would be redirected back into the ring laser to maintain clockwise direction laser action therein. Most of the drive beam passes through the beam splitter 22 and is reinforced by the reflected component of the amplified beam 30 thereby forming the gain medium input beam 34. A complete analysis of the ring laser operation per se is provided hereinafter. Passing the input beam 34 through the gain medium 24 causes a substantial increase in amplitude and the beam continues along the optical path 28 as the amplified beam 30. The fraction of the amplified beam reflected back into the ring depends upon the reflectivity of the beam splitter 22, however, in practice, approximately half of the amplified beam passes through the beam splitter 22 to appear as the ring laser output beam 32, and practically all of the beam 32 passes through the beam splitter 40 to appear as the system output beam 36. The frequency stability of the system is limited only by the stability limitations inherent in the master oscillator and the power of the system is limited only by the amount of and gain characteristics of the gain medium provided in the ring laser.

Figure 3:
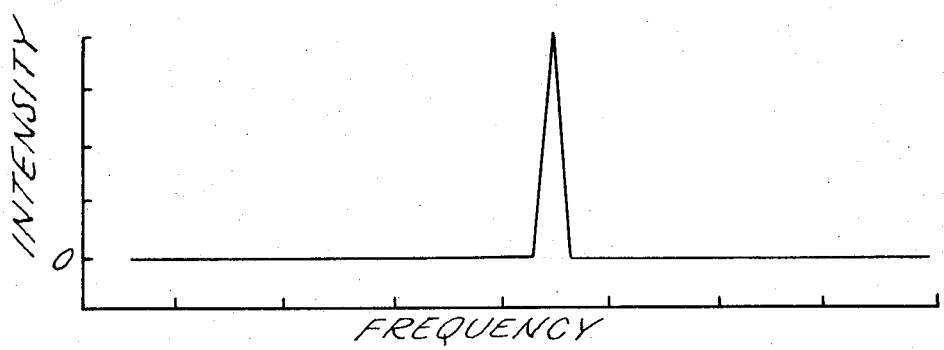
FIG. 3 is an illustration of the intensity versus frequency variation for the drive signal from the oscillator as amplified by passage through the ring laser.
Figure 4:
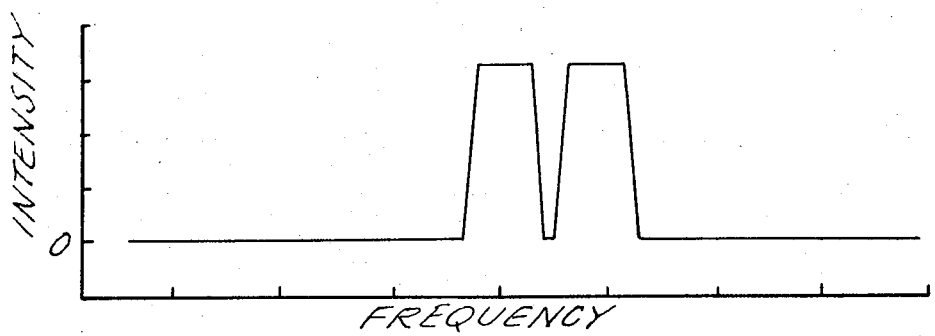
FIG. 4 is an illustration of the intensity versus frequency variation representative of the quenched self oscillation characteristic of the resonant ring laser.

Approximately a few hundred milliwatts of the ring laser output power are reflected by the beam splitter as the feedback beam 38 which in turn is directed to the wavelength discriminator. The function of the discriminator is to separate the beam 38 into its component wavelengths and to transmit only that component which matches precisely the wavelength for the laser transition which occurs in the oscillator providing the drive signal. FIG. 2 shows the output intensity in frequency swept analysis of the output beam 32 which is prior to any wavelength discrimination. The separation of the signal 38 referred to above is apparent from FIG. 3 which shows the intensity of the detector input signal 44 when the discriminator is adjusted for the desired wavelength. FIG. 4 shows the intensity of the detector input signal when the discriminator is adjusted for the quenched wavelength.

The beam transmitted by the discriminator is the detector input beam 44 which upon reaching the detector 46 is converted therein into a voltage and appears as the detector output signal 48.

The detector output signal 48 is transmitted to the ring laser stabilization electronics which by conventional techniques provide the appropriate error signal 52 to vary the length of the optical path 28 within the ring to provide the necessary resonant optical path in the ring matched to the precise wavelength which is produced in the oscillator and is characteristic of the drive signal 12.

In order to more fully explain the operation of the present invention, a detailed analysis on the frequency locking of a high power ring laser to a stable low power oscillator is provided. The analysis which is based on a homogeneously broadened gain medium includes the effects of gain saturation. Assume that the ring laser 14 and the oscillator 10 in FIG. 1 are capable of self oscillation at frequency $f_0$ and $f_1$, respectively; then, in general, when the ring laser is driven by the oscillator, the total power extracted from the ring laser consists of a driven component and undriven component according to the relationship $$\Delta P = \Delta P_{f_1} + \Delta P_{f_0}, \quad (1)$$

where
$\Delta P$ is the total power extracted from the ring laser,
$\Delta P_{f_1}$ is the (driven component) extracted power at the frequency of the low power oscillator, and
$\Delta P_{f_0}$ is the (undriven component) extracted power at the frequency of the ring laser due to self oscillation of the ring.

For the condition at which the resonant path length of the ring laser is matched to the frequency of the drive signal, it can be shown that $$\Delta P_{f_1} = \frac{P_0(g^2 - 1)(1 - r^2)}{(1 - rg)^2 + 4rg \sin^2\left(\frac{\theta}{2}\right)} \quad (2)$$

where
$P_0$ is the power in the ring laser due to self oscillation under undriven condition,
$g$ is the saturated field gain,
$r$ is the mirror field reflectivity, and
$\theta$ is the cavity tuning angle;
the second term of the denominator represents the off resonance contribution.

As a result of the saturation effects and the competition between the drive transition and the self oscillation during driven operation of the ring laser, in the small tuning region near where the cavity tuning angle is nearly equal to zero, the drive signal at frequency $f_1$ decreases the gain below threshold (minimum gain at which the ring laser will self oscillate) and quenches the self oscillation at frequency $f_0$. Within this tuning region, the cavity tuning angle is less than the maximum angle over which the cavity will lock to frequency of the injected signal, and the locking of the high power laser to the injected signal is complete. Under these conditions, self oscillation within the ring is entirely suppressed, with $\Delta P_{f_0} = 0$ and only power at the frequency of the injected signal is observed, that is, $\Delta P = \Delta P_{f_1}$. The locking angle which defines the boundary of this region is the point at which the saturated gain is at its threshold value, that is, $g = 1/r$ and the total power extracted ($\Delta P$) is equal to the power available from self oscillation during undriven operation ($\Delta P_0$). Therefore, when ($\theta = \theta_L$) ($\theta_L$ being the locking angle), equation (2) reduces to $$\Delta P(\theta = \theta_L) = \Delta P_0 = \frac{P_0(1 - r^2)^2}{r^2 \sin^2\left(\frac{\theta_L}{2}\right)}. \quad (3)$$

By employing the small angle approximations, the locking angle range ($\Delta \theta_L$) is found to be given by $$\Delta \theta_L = 2\theta_L = 2 (P_0/\Delta P_0)^{1/2} [(1-r^2)/r], \quad (4)$$

or in terms of frequency $$\Delta f_L = (c/\pi p) (P_0/\Delta P_0)^{1/2} [(1-r^2)/r], \quad (5)$$

where
$c$ is the velocity of light, and
$p$ is the ring laser perimeter.

In order to broaden the locking range such techniques as increasing the output coupling, using higher drive powers, or increasing the axial mode spacing by decreasing the resonator perimeter can be employed.

Outside the locking range where $|\theta|$ is greater than $|\theta_L|$ the extracted power consists of a contribution from both self oscillation ($\Delta P_{f_0}$) and amplified drive power ($\Delta P_{f_1}$). Since $rg = 1$ in this region, using the small angle approximation and equation (2), the amplified drive power can be expressed as $$\Delta P_{f_1} = [\Delta P_0(1-r^2)^2]/(r^2\theta^2) \text{ for } |\theta| > |\theta_L|, \quad (6)$$

or $$\Delta P_{f_1} = \Delta P_0 (\theta_L/\theta)^2 \text{ for } |\theta| > |\theta_L|. \quad (7)$$

Outside the locking range the total power is equal to the power available from self oscillation during undriven operation and the undriven contribution can be rewritten as $$\Delta P_{f_0} = \Delta P_0 [1 - (\theta_L/\theta)^2] \text{ for } |\theta| > |\theta_L|. \tag{8}$$

Within the locking range there is no self oscillation. For the conditions of interest the product of the saturation gain and reflectivity is slightly less than unity and dependent on the tuning angle $\theta$. This can be expressed as $$gr = 1 - \epsilon(\theta)$$

for
$$\epsilon(\theta) << 1$$
$$\theta << 1. \tag{9}$$

It has been shown that for homogeneously broadened media such as carbon dioxide, the extracted power can be expressed implicity as $$\Delta P = 2P_s \ln(g_0/g) \tag{10}$$

where
 $P_s$ is the saturation power,
 $g_0$ is the small signal gain, and
 $g$ is the saturated gain.
The extracted power from the undriven laser in the absence of an externally injected signal is given by $\Delta P = \Delta P_0 = 2P_s \ln g_0 r \tag{11}$ since during oscillation $gr = 1$. An expression for the extracted power in the locking range can be derived by combining equations (9) and (11) as $$\Delta P = \Delta P_0 + 2P_s \epsilon(\theta) \text{ for } |\theta| \leq |\theta_L|. \tag{12}$$

For small pertubations the peak value of $\theta$ which occurs when $\theta = 0$ is found to be equal to $\theta_L$. Thus, for small perturbations the limits upon the extracted power within the region of locking range are $$\Delta P_0 \leq P \leq \Delta P_0 + 2P_s (P_0/\Delta P_s)^{1/2}[(1-r^2)/r]$$
$$\text{for } |\theta| \leq |\theta_L| \tag{13}$$

in which $\Delta P$ is a maximum when $\theta = 0$. For low power lasers operating slightly above threshold, $\Delta P_0$ is quite small and the extracted power can be larger than $\Delta P_0$ for $\theta \approx 0$. On the other hand, for high power lasers where $\theta P_0/P_0 >> 1$, the departure of the extracted power from $\Delta P_0$ over the locking range is quite small.

FIG. 5 is a plot of the driven and undriven contributions to the total extracted powers of function as cavity tuning angle both within and outside the frequency locking range; the solid and dashed curve lines represent the driven contribution ($\Delta P_{f_1}$) and the undriven contribution ($\Delta P_{f_0}$), respectively. The broken horizontal line ($\Delta P_0$) represents the ring laser output power due to self oscillation during undriven conditions and $\Delta P_D$ represents the additional power available in the output beam 32 when the ring laser is being driven by the stable frequency oscillator.

While the present invention has been described with reference to ring laser having a carbon dioxide gas as the gain medium, this is not meant to suggest that carbon dioxide is the only workable laser medium; any homogeneously broadened laser medium is readily substitutable. Similarly, the high power laser is described as a four-leg ring laser but any ring laser geometry is suitable to practice this invention. In fact, the ring laser can be readily replaced by a linear resonant optical cavity although in such an embodiment, an optical isolator is required between the stable laser and the power laser, and both mirrors therein must be partially transparent.

An additional variation of this invention includes using the laser beam direction of polarization rather than wavelength as the characteristic property of the stable laser. In such a system, Brewster angle windows would not be acceptable and the polarization of the injected beam would differ from that of the self oscillation of the higher power driven laser.

Although the invention has been shown and described with respect to preferred embodiments thereof it should be understood by those skilled in the art that various changes and omissions in the form and details thereof may be made without departing from the spirit and the scope of the invention.

Having thus described a typical embodiment of our invention, that which we claim as new and desire to secure by Letters Patent of the United States is:

1. A stable frequency laser system comprising:
   means for providing a drive beam of electromagnetic energy having a stable frequency and a characteristic first wavelength;
   laser power oscillator means containing a homogeneously broadened gain medium for providing an output beam of electromagnetic energy having a characteristic second wavelength including means for coupling the drive beam into the power oscillator means; and
   means responsive to the wavelength of the output beam for tuning the optical path length of the power oscillator to quench all resonance at the second wavelength and amplify the intensity of the output beam at the first wavelength thereby providing a stable frequency output beam of amplified laser energy at the characteristic first wavelength of the drive beam.

2. A laser system according to claim 1 wherein the means for providing a drive beam is a stable frequency laser oscillator.

3. A laser system according to claim 2 wherein the power oscillator is in a ring configuration.

4. A laser system according to claim 3 wherein the means for tuning the path length of the power oscillator comprises:
   a beam splitter which interacts with the output beam and produces a feedback beam;
   a wavelength discriminator which transmits that portion of the feedback beam that is at the first wavelength;
   detector means which respond to the beam transmitted by the discriminator by producing an electrical signal;
   stabilization servo electronics means which are responsive to the detector signal and which provides an appropriate error signal; and
   a piezoelectric transducer which is fixedly attached to one of the reflector elements forming the ring configuration, the transducer being responsive to the error signal whereby the optical path length of the regenerative oscillator is adjusted to be resonant at the first wavelength.

* * * * *